Nov. 25, 1969   T. C. TURNER ET AL   3,480,320
UNIVERSAL TRAILER VEHICLE
Filed Oct. 24, 1967   2 Sheets-Sheet 1
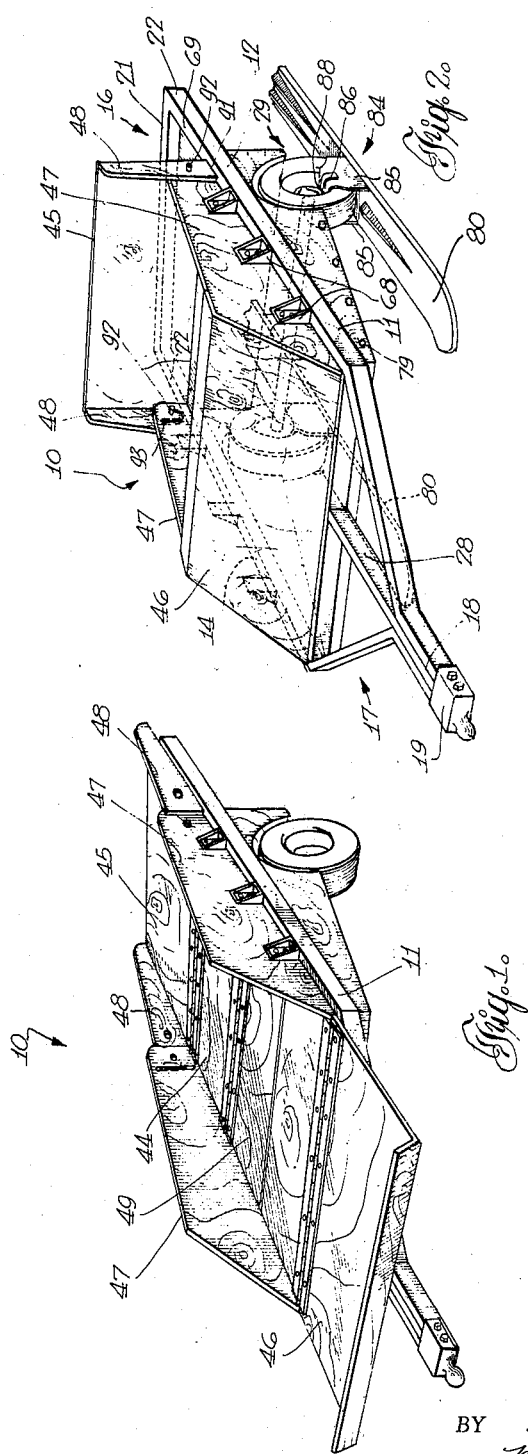
INVENTORS
THOMAS C. TURNER
LYNDEN Y. McINTOSH
BY Weir, Marshall
MacRae & Lamb
PATENT AGENT

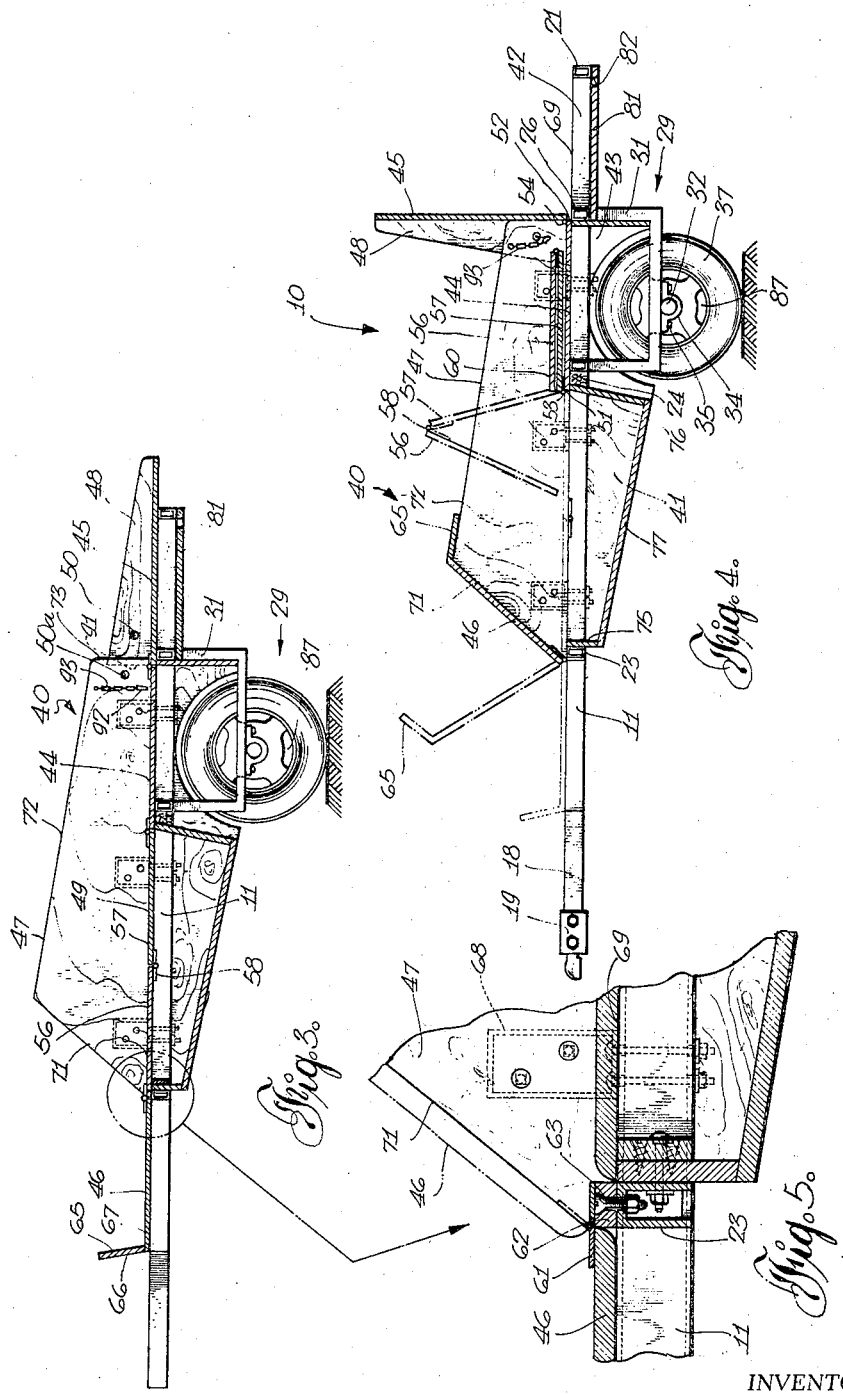

United States Patent Office 3,480,320
Patented Nov. 25, 1969

3,480,320
UNIVERSAL TRAILER VEHICLE
Thomas C. Turner, 1116 Victoria Ave., and Lynden Y. McIntosh, 308 Victoria Ave., both of Fort William, Ontario, Canada
Filed Oct. 24, 1967, Ser. No. 677,703
Int. Cl. B60p 3/42; B62c 1/06; B62b 13/18
U.S. Cl. 296—10                    5 Claims

ABSTRACT OF THE DISCLOSURE

A trailer to be propelled by suitable means on land or snow and so constructed as to be readily converted from a flat, horizontal, load bearing work unit to a compact pleasure unit by means of a plurality of hingedly connected members arranged on the trailer.

---

This invention relates to a trailer vehicle and more particularly to a trailer which may be readily converted to be movable on land or snow, and from a working unit to one of a pleasure unit.

In today's fast growing sport of motor tobogganing (one of such motor tobogganing units is commonly known under the trademark "Ski-Doo"), the problem exists in transporting the unit from one location to another. Some attempts have been made in the past to produce a suitable trailer for such transporting means, however, they have failed to find commercial acceptance mainly due to the lack of economy, simplicity and restriction of use which render them of an impractical nature.

It is therefore an object of this invention to provide a trailer of the type described which improvements comprise means by which the trailer may be supported for travel selectively upon skis or wheels in order that it may be useful under all weather conditions and may be appropriately converted in accordance therewith.

A further object is to provide a trailer which may be readily converted from a flat, horizontally disposed work unit for carrying heavy loads, such as a "Ski-Doo" or perhaps a deer in hunting season from one place to another, or alternatively, to one of a pleasure unit which may be utilized for transporting people.

A basic feature of the present invention resides in the fact that the trailer in accordance therewith includes a chassis, a universal load bearing main structure secured thereto, and adapted to be readily converted from a first substantially horizontal work unit, to a second compact pleasure unit, means adapted to contact and movably support the trailer on land or snow and a hitching device positioned at the one end of the chassis adapted to be detachably mounted to a powered vehicle in order to propel said trailer over the land or snow.

The invention will be described with reference to the accompanying drawings, in which:

FIG. 1 is a perspective view of the trailer as a working unit and having wheels thereon in accordance with the invention.

FIG. 2 is a perspective view of the trailer as shown in FIG. 1 but converted from a work unit to a pleasure unit and further, to one to be drawn over snow or ice in accordance with the invention.

FIG. 3 is a cross-sectional side view of the trailer converted from a pleasure unit as shown in FIG. 4 to a work unit in accordance with the invention.

FIG. 4 is a cross-sectional side view of the trailer converted from a work unit as shown in FIG. 3 to a pleasure unit in accordance with the invention, and FIG. 5 is an enlarged view of the structure shown in the encircled area in FIG. 3.

Referring to the drawing, FIGS. 1 to 4 show a trailer attachment as heretofore described, completely assembled and detached from a motor vehicle transporting means (not shown).

Trailer 10 mainly comprises a chassis 11 having a pair of opposed longitudinal extending parallel side frame members 12 and 14 suitably braced as shown. The chassis may be fabricated of such material as channel iron, or the like, however, in the preferred embodiment, a beam of hollow rectangular cross section is desirable for maximum strength and rigidity. The side frame members of the chassis have rear end portions 16 which are spaced from each other substantially the desired width of the trailer, and a front end portion 17, which tapers inwardly to form a single longitudinal extending shaft member 18, to which is attached thereto a hitching bracket 19, of conventional type. It will be understood that the hitching bracket is utilized for the purpose of receiving a complementary attachment on a motor vehicle transporting means (not shown).

The chassis 11 further comprises a plurality of cross bracing members in order to render it durable for transporting heavy loads over rough and uneven terrain. Such bracing members include a rear member 21 fixed to the end portions 22 of side frame members 12 and 14 and a front member 23 fixed to the side frame members substantially at the initial bend of the side frame members from the rear end portion to the front end portion. A pair of spaced apart bracing members 24 and 26 are positioned intermediate the front and rear members and are also securely fixed to the side members.

Each of the cross bracing members as heretofore mentioned, has an axis transverse to the longitudinal extending axis of the chassis and are parallel to each other. Further, bracing members 24 and 26 are located on the chassis somewhat closer to the rear cross member 21 than front member 23 for reasons as will be hereafter described. Stiffening member 28 may also be provided for additional rigidity to the chassis and trailer as it is being drawn over rough terrain.

Means are provded on chassis 11 for movably supporting the trailer on land or snow. One of such means comprises a pair of wheel assemblies 29, each having a U-shaped bracket 31 the free ends of which are welded or otherwise fixed to cross bracing members 24 and 26. Axle 32 extends between each bracket 31 and is attached thereto by means of clamps 34 and bolts 35. The free ends of axle 32 are adapted to rotatably receive wheels 37.

A universal load bearing structure 40 having a front compartment 41 and a wheel well portion 43 is mounted on chassis 11. A rear tray 42 may also be provided on the structure if desirable. The structure may be fabricated from plywood, as shown, or alternatively of suitable metal or plastic sheet material. The component parts of the structure mainly comprise a flat stationary member 44 which is securely held to the chassis, a back supporting member 45, a front panel 46, a pair of upstanding side walls 47 and a foldable floor member 49. Stationary member 44 has a front edge portion 51 and a rear edge portion 52 to which there is attached by means of hinges 53 and 54 floor member 49 and back supporting member 45, for limited upward swinging movement about an axis extending transverse to the longitudinal axis of the trailer 10. Upstanding side members 48 are positioned on the outer periphery of the back support member and are adapted to overlap the upstanding side walls 47. Each side member 48 has an aperture 50 thereto which has an aligned relationship with aperture 50a in side walls 47 when the trailer is used as a pleasure unit as shown in FIGS. 2 and 4. As will be noted from FIG. 4, it is advantageous that the floor member 49 be in two equal sections 56 and 57 and hingedly joined together by hinge means 58, in order that one section 56 may fold upon the second section 57 and in turn both sections fold upon the flat stationary member 44. It will be apparent from the drawings that the structure as disclosed when folded back acts as a seat 60 and at the same time permits entry to front compartment 41.

Front panel 46 is hingedly attached to front cross bracing member 23 as by means of hinge 61, spacer piece 62 and bolts 63. A stop 65 in the form of an upright protruding lip 66 is positioned adjacent the front portion 67 of the panel and extends substantially the full width thereof. Although not essential, it is desired that each hinge joining the heretofore mentioned component parts be of a continuous piano type in order to provide additional rigidity to the load bearing structure.

Each side panel 47 extends a portion above and below side frame members 12 and 14 and are secured to the inner face thereof by means of brackets 68 bolted to top face 69 of the frame members. The wall panels extend from a point adjacent the hinged portion of front panel 46 to the hinged portion of the back support panel 45. Forward edge 71 of each wall panel extending above the side frame members 12 and 14 are tapered rearwardly approximately 45°. The top edge 72 is tapered from the forward edge 71 toward the back edge 73 as will be noted in FIGS. 3 and 4. The back edge may be substantially perpendicular.

Front compartment 41 is disposed beneath the side frame members 12 and 14 and forward of the wheel assemblies 29. The compartment comprises a front wall section 75, a rear wall section 76 and a bottom wall section 77. Each wall section is fixed to side wall panels 47 by any suitable means, such as in this instance, wood screw 79. The front and rear wall sections are also secured to cross bracing members 23 and 24. The compartment may be utilized for carrying supplies or the like, which may include a pair of skis 80, which skis may be readily attached to each wheel 37 by bracket assemblies 84 in the event climatic conditions make it necessary to convert the trailer from one movable on land, to one movable on snow or ice. Each of the bracket assemblies 84 comprises a pair of upright wheel receiving brackets 85 adapted to straddle the wheel 37 and at least one pair of straps 86, which may be inserted through apertures 87 in each wheel 37 and joined together thereby by means of a buckle 88 or the like.

A bottom plate 81 may be fixed to the bottom portions of side frame members 12 and 14 and to cross bracing members 21 and 26, to provide a tray which may be utilized for carrying excess baggage or the like when the trailer is used as a pleasure unit. Aperture 82 may be provided in the bottom plate 81 for the removal of moisture which may gather in the tray Operation FIGS. 1 and 3 show the trailer 10 as a work unit. It will be noted that all members, such as back supporting panel 45, foldable floor member 49, front panel 46 and, of course, stationary member 44 are disposed in a flat horizontal plane on chassis 11, which provides a substantially flat bed upon which an object such as a Ski-Doo, may be placed for the purpose of transporting it from one place to another. In this particular arrangement, the foldable floor member 49 completely covers the opening 90 of front compartment 41, thus also providing a cover for the protection of the supplies or the like in the compartment as heretofore mentioned.

FIGS. 2 and 4 show the trailer 10 converted from a work unit as shown in FIGS. 1 and 3 to one of a pleasure unit. To this end, back supporting panel 45 is swung upward until the base portion 91 of each upstanding side member 48 is positioned on the top face 69 of side frame members 12 and 14 and apertures 50 and 50a are in opposed aligned position to each other. Pins 92 secured to the inside of each side wall 47 by means of chains 93 are inserted through the apertures in order to retain the back support member in a perpendicular position.

Secondly, the rearward section 57 of the foldable floor member is hingedly swung into horizontal engagement with stationary flat member 44 and in turn forward section 56 of the floor member is folded upon section 57. The folding of the sections one upon the other provides a seat for passengers being transported by the trailer and at the same time opens compartment 41 to receive the legs of the passengers.

Thirdly, front panel 46 is then hingedly swung upwardly into engagement with the forward tapered edge 71 of the side panels 47 and stop member into engagement with the top tapered edge portions 72. In this position, it will be apparent that the front panel will act as a wind break for the passengers who are being transported by the trailer.

We claim:
1. A trailer for attachment to a powered vehicle which comprises a chassis, means supporting said chassis for movement, a load bearing structure mounted on said chassis comprising a compartment having a front wall, a rear wall, a bottom wall, and an open top, a front panel hingedly connected to said chassis adjacent said front wall, a first floor panel fixed to said chassis and extending rearwardly from the top of said rear wall, a second floor panel hingedly connected to said first floor panel adjacent said rear wall, said second floor panel being swingable to a first position in overlying relation to said open top to substantially close said compartment and to a second position in seated relation to said first floor panel, said front panel being swingable to a first position in overhanging relation to said compartment and to a second position in generally planar relation to said first floor panel, a back panel hingedly connected to said first floor panel and having a first position in substantially upstanding relation to said first floor panel and a second position in substantially planar relation to said first floor panel, and means supporting said front and back panels in said positions.

2. A trailer as defined in claim 1, including a pair of side walls fixed to said chassis in substantially upstanding relation with respect to the plane of said first floor panel, said side walls having inclined edges engageable by said front panel to constitute said means for supporting said front panel in said first position.

3. A trailer as defined in claim 1, said chassis having a portion extending rearwardly from said first floor panel, said back panel being engageable with said rearwardly extending portion to constitute said means supporting said back panel in said second position thereof.

4. A trailer as defined in claim 1, said second floor panel comprising a pair of panel sections hingedly connected together.

5. A trailer as defined in claim 2, said means for supporting said back panel in said first position comprising a side member fixed to each side edge of said back panel, said side members being in overlapping engagement with said side walls in said first position of said back panel, and means adjustably securing said side members to said side walls.

References Cited

UNITED STATES PATENTS

| 2,352,966 | 7/1944 | Morando | 280—8 |
| 2,054,122 | 9/1936 | Eisenberg | 296—10 |
| 2,720,413 | 10/1955 | Halverson | 296—10 |
| 3,180,654 | 4/1965 | Westfall | 280—30 |

LEO FRIAGLIA, Primary Examiner

J. E. SIEGEL, Assistant Examiner

U.S. Cl. X.R.

280—8; 296—57